(12) United States Patent
Kitamura et al.

(10) Patent No.: US 6,293,882 B1
(45) Date of Patent: Sep. 25, 2001

(54) OPERATING FORCE COMPENSATING APPARATUS FOR A BICYCLE TRANSMISSION

(75) Inventors: Satoshi Kitamura, Kitakatsuragigun; Kazuhiro Fujii, Kawachinagano, both of (JP)

(73) Assignee: Shimano, Inc., Osaka (JP)

( * ) Notice: Subject to any disclaimer, the term of this patent is extended or adjusted under 35 U.S.C. 154(b) by 0 days.

(21) Appl. No.: 09/459,252

(22) Filed: Dec. 10, 1999

(51) Int. Cl.[7] ............................................. F16H 9/00
(52) U.S. Cl. ..................................... 474/80; 474/70
(58) Field of Search ............................ 474/80, 81, 82, 474/69, 70, 71; 185/37, 40 H

(56) References Cited

U.S. PATENT DOCUMENTS

| 4,864,885 | | 9/1989 | Nagano ........................ 74/502.2 |
| 4,952,196 | * | 8/1990 | Chilcote et al. ................. 474/70 |
| 5,102,372 | | 4/1992 | Patterson et al. ................ 474/80 |
| 5,618,241 | | 4/1997 | Ose .............................. 474/80 |
| 5,653,649 | * | 8/1997 | Watarai .......................... 474/78 |
| 5,681,234 | * | 10/1997 | Ethington ...................... 474/70 |
| 6,162,140 | * | 12/2000 | Fukuda ........................... 474/70 |

FOREIGN PATENT DOCUMENTS

| 392457 A1 | 10/1990 | (EP) . |
| 423779 A1 | 4/1991 | (EP) . |
| 2099961 A | 12/1982 | (GB) . |

* cited by examiner

*Primary Examiner*—David A. Bucci
*Assistant Examiner*—Vicky A. Johnson
(74) *Attorney, Agent, or Firm*—James A. Deland

(57) ABSTRACT

A motor drive apparatus for a bicycle transmission includes a support; an interface member for coupling to a transmission actuating member that exerts a first force having a first force component in a first direction, wherein the interface member is mounted to the support for rotation around a rotational axis; a motor for coupling to the interface member; and a biasing mechanism for exerting a second force on the interface member having a second force component in a second direction opposite the first direction.

24 Claims, 7 Drawing Sheets

OPERATING FORCE COMPENSATING APPARATUS FOR A BICYCLE TRANSMISSION

BACKGROUND OF THE INVENTION

The present invention is directed to control devices for bicycle transmissions and, more particularly, to an apparatus that compensates for return spring and other forces applied by the bicycle transmission to a motor drive used to operate the bicycle transmission.

There are two major types of bicycle transmissions currently marketed. One type of bicycle transmission uses a derailleur to shift a chain from one sprocket to another to change the drive ratio, and the other type uses a planetary gear mechanism disposed inside a rotating hub such as a wheel hub to change the drive ratio. In either case, an operating member such as a lever, push rod or rotatable ring is moved to operate the transmission, and the operating member is connected to a transmission actuating member such as a control wire or link that is pulled or released by the rider to cause the desired movement of the operating member. To facilitate the operation of the transmission in a pull and release manner, a return spring commonly is used to bias the operating member to an initial state. The transmission then is operated by moving the operating member against the progressively increasing force of the return spring and the natural resistance by the transmission to changing gears. When the resistance of the return spring is added to the natural resistance by the transmission to changing gears, the force that must be applied to the transmission actuating member can become quite large.

Motor-driven bicycle transmissions are becoming more common. Such motor-driven bicycle transmissions relieve the rider of the task of manually pulling and releasing the transmission actuating member. Of course, the motor used to cause the pulling and releasing of the transmission actuating member must be designed to withstand the forces noted above. This sometimes makes it necessary to use a relatively large motor which increases the cost, size and weight of the transmission operating mechanism. The larger motor also creates significantly more current drain on the battery used to operate the motor, thus resulting in short battery life. Consequently, motor-driven transmissions usually are not used when the size, cost or weight of the bicycle is an important factor, such as in racing environments.

SUMMARY OF THE INVENTION

The present invention is directed to an operating force compensating apparatus for a bicycle transmission that reduces the force required to operate the bicycle transmission and hence allows the use of a small motor to operate the transmission. In one embodiment of the present invention, a motor drive apparatus for a bicycle transmission includes a support; an interface member for coupling to a transmission actuating member that exerts a first force having a first force component in a first direction, wherein the interface member is mounted to the support for rotation around a rotational axis; a motor for coupling to the interface member; and a biasing mechanism for exerting a second force on the interface member having a second force component in a second direction opposite the first direction.

In a more specific embodiment, a cam having a cam surface varies the second force applied to the interface member by the biasing mechanism. In the typical situation where the biasing mechanism exerts the second force at a force applying location on the interface member, the cam usually varies the force applying location relative to the rotational axis. More specifically, the interface member may have the shape of a lever with an actuating member connector for connecting to the transmission actuating member, wherein the actuating member connector is radially spaced apart from the rotational axis. The interface member includes a cam follower for engaging the cam surface, wherein the cam follower is located at an intermediate portion of the lever between the actuating member connector and the rotational axis. Thus, the force applying location rotates around the rotational axis when the interface member rotates around the rotational axis. A first axis extending between the rotational axis and the force applying location is inclined relative to a second axis extending between the rotational axis and the cam follower. If the biasing mechanism comprises a spring having a first end coupled to the support and a second end coupled to the force applying location for applying the second force along a spring axis, then rotation of the interface member varies the distance between the spring axis and the rotational axis, thus varying the torque applied to the interface member to compensate for the resistance exerted by the transmission.

DETAILED DESCRIPTION OF THE EMBODIMENTS

Figure 1:
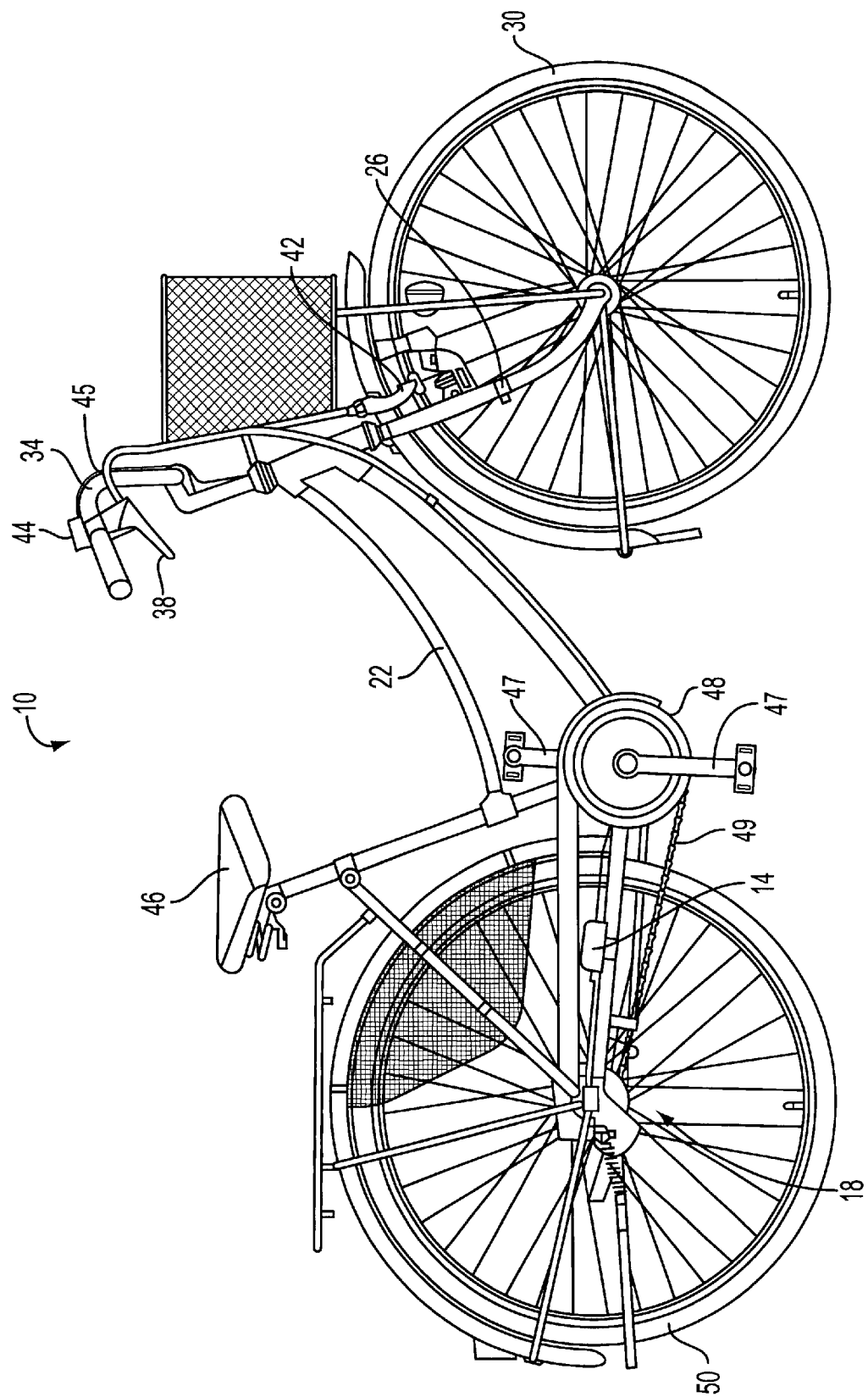
FIG. 1 is a side view of a bicycle that uses a motor drive unit including a particular embodiment of an operating force compensating apparatus according to the present invention for a bicycle transmission.

FIG. 1 is a side view of a bicycle 10 that uses a motor drive unit 14 including a particular embodiment of an operating force compensating apparatus according to the present invention for a bicycle transmission 18. Bicycle 10 includes a frame 22, a fork 26 rotatably mounted to frame 22 for rotatably supporting a front wheel 30, a handlebar 34 mounted to fork 26, a brake lever 38 mounted to handlebar 34 for operating a front wheel caliper brake 42, a shift control device 44 mounted to handlebar 34 for controlling motor drive unit 14 through an electrical wire 45, a seat 46, pedal cranks 47 rotatably mounted to frame 22 for rotating a front chainwheel 48 connected to a chain 49, and a rear wheel 50 rotatably mounted to frame 22. In this embodiment, bicycle transmission 18 is an internal wheel hub transmission that has a planetary gear mechanism for changing the gear ratio by routing a rotational force applied by chain 49 through a plurality of transmission paths in a well-known manner.

Figure 2:
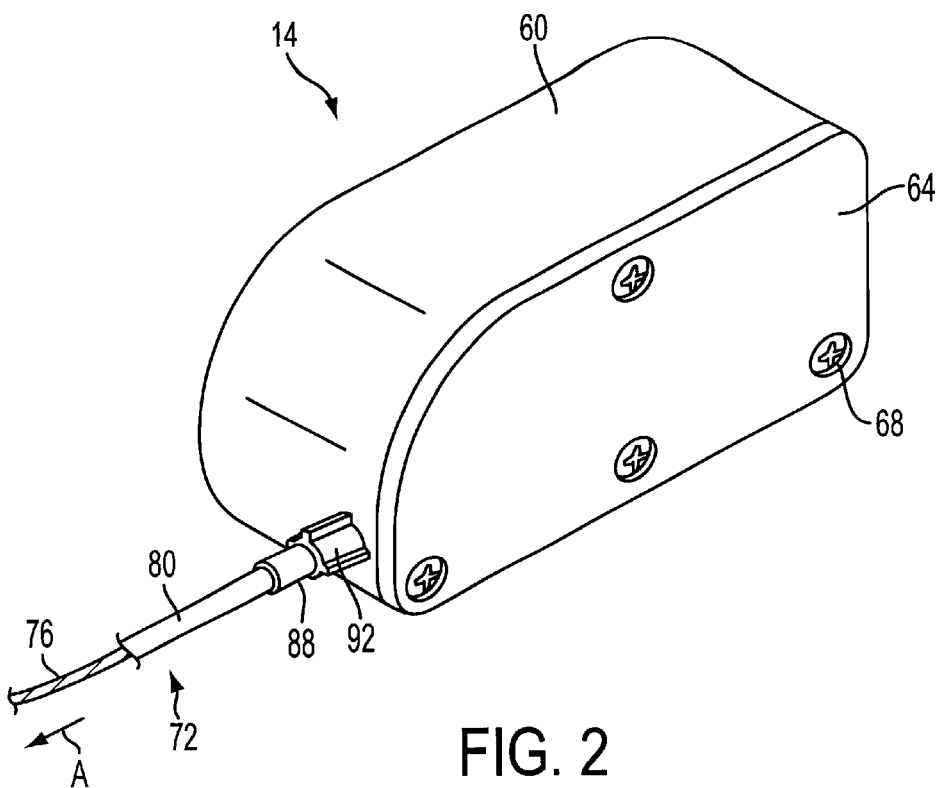
FIG. 2 is an oblique view of the motor drive unit shown in FIG. 1.
Figure 3:
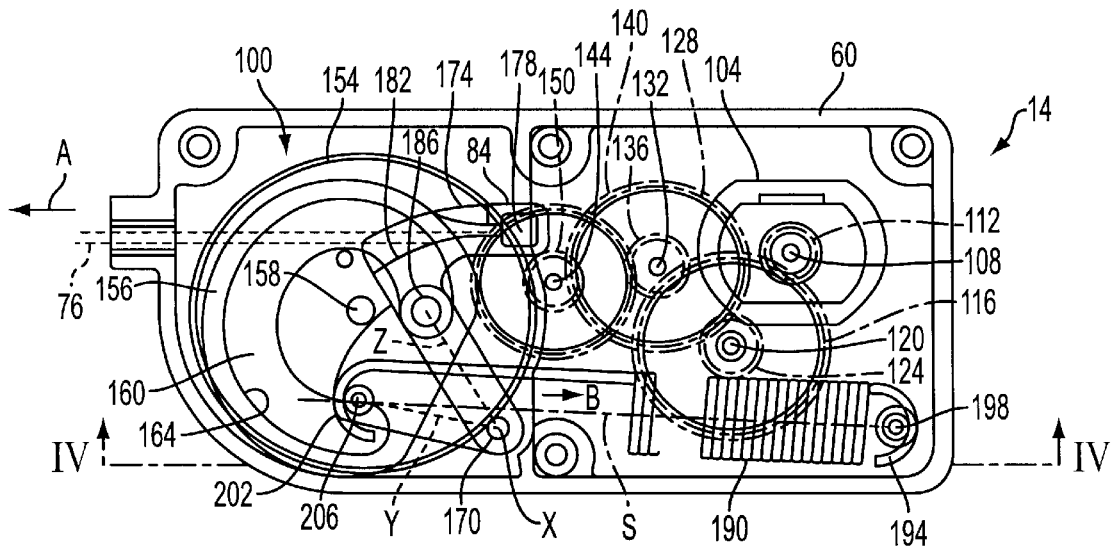
FIG. 3 is an exposed side view of the motor drive unit showing the force compensating apparatus in a first transmission setting position.

FIG. 2 is an oblique view of the motor drive unit 14 shown in FIG. 1. Motor drive unit 14 includes a housing 60 and a side cover 64 mounted to housing 60 by screws 68. Motor drive unit 14 is connected to a Bowden cable assembly 72 wherein a transmission actuating member in the form of a transmission actuating wire 76 is slidingly disposed within an outer casing 80. One end of transmission actuating wire 76 is connected to the operating member (not shown) for transmission 18 in a well known manner, and the other end of transmission actuating wire 76 is connected to an interface member 84 (FIG. 3). One end of outer casing 80 is terminated at a casing stop (not shown) at transmission 18 in a well known manner, and the other end of outer casing 80 is terminated at a casing stop 88 which, in this embodiment, includes a conventional cable adjusting barrel 92 that is screwed into housing 60. Transmission 18 includes a conventional return spring (not shown) that exerts a return spring force in a direction indicated by an arrow A that tends to pull transmission actuating wire 76 out of housing 60.

Figure 4:
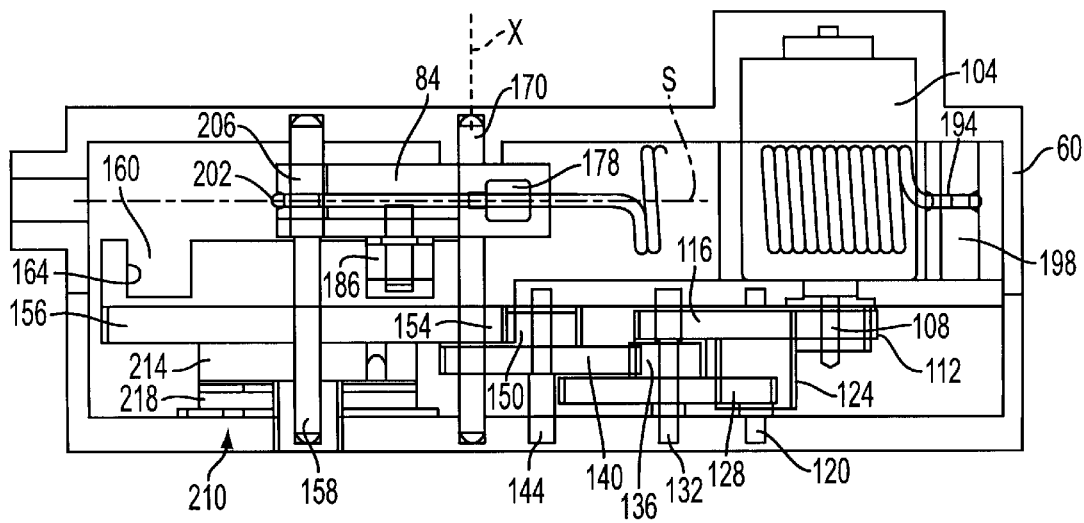
FIG. 4 is a view taken along line IV—IV in FIG. 3.

FIG. 3 is an exposed side view of motor drive unit 14 showing a particular embodiment of a force compensating apparatus 100 according to the present invention in a first transmission setting position (low speed position), and FIG. 4 is a view taken along line IV—IV in FIG. 3. As shown in those Figures, a motor 104 having a drive shaft 108 and a drive pinion 112 is mounted to housing 60. Drive pinion 112 meshes with a large diameter gear 116 that is rotatably mounted to housing 60 through a pivot shaft 120. A small diameter gear 124 that rotates together with large diameter gear 116 meshes with a large diameter gear 128 that is rotatably mounted to housing 60 through a pivot shaft 132. A small diameter gear 136 that rotates together with large diameter gear 128 meshes with a large diameter gear 140 that is rotatably mounted to housing 60 through a pivot shaft 144. A small diameter gear 150 that rotates together with large diameter gear 140 meshes with a large diameter gear 154 that is formed on the outer peripheral surface of a cam member 156 rotatably mounted to housing 60 through a pivot shaft 158. Cam member 156 has a nautilus-shaped cam slot 160 forming a cam surface 164. Gears 116, 124, 128, 136, 140 and 150 function as a gear reduction mechanism between motor 104 and cam member 156 for stepping down the speed of rotation of drive shaft 108.

Interface member 84 has a general shape of a lever that has a first end mounted to housing 60 through a pivot shaft 170 for rotation around a rotational axis X. A second end of interface member 84 has an actuating member connector 174 spaced apart from axis X for connecting to transmission actuating wire 76. Actuating member connector 174 includes a cable end bead receptacle 178 for supporting a conventional cable end bead affixed to the end of transmission actuating wire 76, and a cable winding surface 182 located in close proximity to cable end bead receptacle 178 for winding transmission actuating wire 76 as interface member 84 rotates clockwise. A cam follower in the form of a roller 186 is located on an intermediate portion of interface member 84 for engaging cam surface 164 of cam member 156.

A biasing mechanism in the form of a coil spring 190 has a first end 194 connected to housing 60 by a mounting post 198 and a second end 202 connected to interface member 84 by a mounting post 206. Thus, mounting post 206 functions as a force applying location for coil spring 190, which exerts a spring force in a direction B along a spring force axis S that is spaced apart from rotational axis X. It should be readily apparent that the direction B of the spring force has a component opposite direction A of the resistance exerted by transmission actuating wire 76. In this embodiment, a first axis Y extending between rotational axis X and mounting post 206 is inclined relative to a second axis Z extending between rotational axis X and cam follower roller 186.

Figure 5:
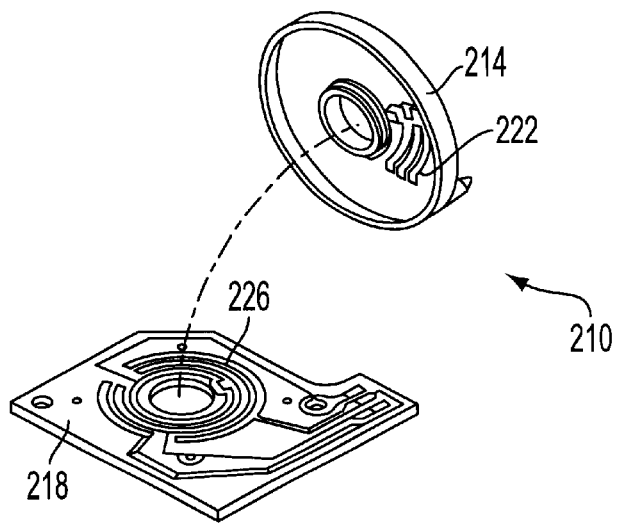
FIG. 5 is a diagram illustrating a position sensor used with the force compensating apparatus.

A position sensor 210 is associated with cam member 156 for providing signals indicating the rotational position of cam member 156 and hence the position of interface member 84. As shown in FIGS. 4 and 5, position sensor 210 includes a brush mounting member 214 that rotates together with cam member 156 and a conductive trace mounting member 218 that is fixedly mounted to housing 60. Brush mounting member 214 includes for example, three conductive brushes 222 that contact conductive traces 226 on conductive trace mounting member 218 in a well known manner for providing the signals indicating the position of cam member 156.

Figure 6:
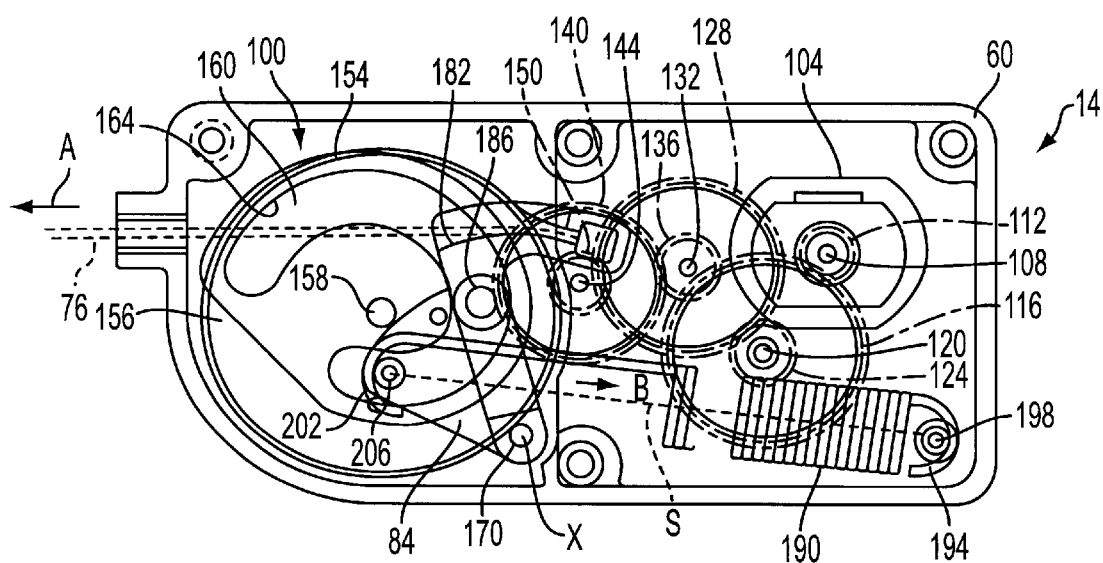
FIG. 6 is an exposed side view of the motor drive unit showing the force compensating apparatus in a second transmission setting position.
Figure 7:
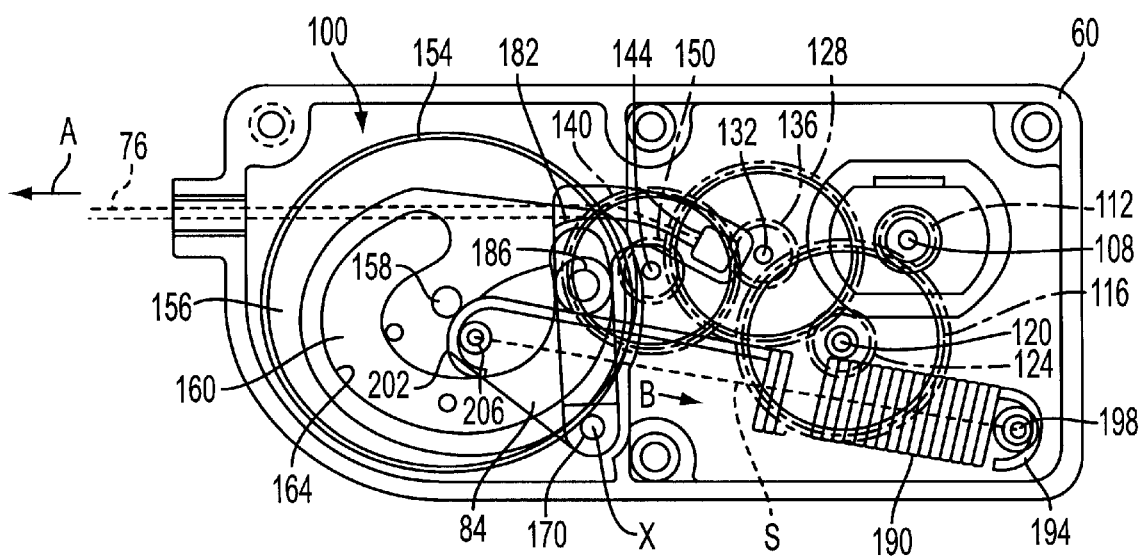
FIG. 7 is an exposed side view of the motor drive unit showing the force compensating apparatus in a second transmission setting position.

Operation of motor drive unit 14 and operating force compensating apparatus 100 can be understood by referring to FIGS. 3, 6 and 7. In general, as cam member 156 rotates clockwise, roller 186 follows cam surface 164 and rotates interface member 84 clockwise, thus varying the position of mounting post 206 relative to rotational axis X. At the same time, the distance between rotational axis X and spring force axis S increases, thus increasing the torque on interface member 84. In FIG. 3, cam member 156 and hence interface member 84 is in the low speed position. In this position the return spring and other forces in bicycle transmission 18 exert a relatively small resistance force on transmission actuating wire 76. At the same time, spring force axis S is located relatively close to rotational axis X, so a small torque is applied to interface member 84. In FIG. 6, motor 104 rotates cam member 156 and hence interface member 84 to the intermediate speed position. In this position bicycle transmission 18 exerts a greater resistance force on transmission actuating wire 76 than it did when interface member 84 was in the low speed position. At the same time, spring force axis S is located a greater distance from rotational axis X, so a greater torque is applied to interface member 84 to compensate for the increased transmission resistance force. In FIG. 7, motor 104 rotates cam member 156 and hence interface member 84 to the high speed position. In this position bicycle transmission 18 exerts its greatest resistance force on transmission actuating wire 76. At the same time, spring force axis S is located at a substantial distance from rotational axis X, thus providing significant torque to interface member 84 to compensate for this large transmission resistance force.

Figure 8:
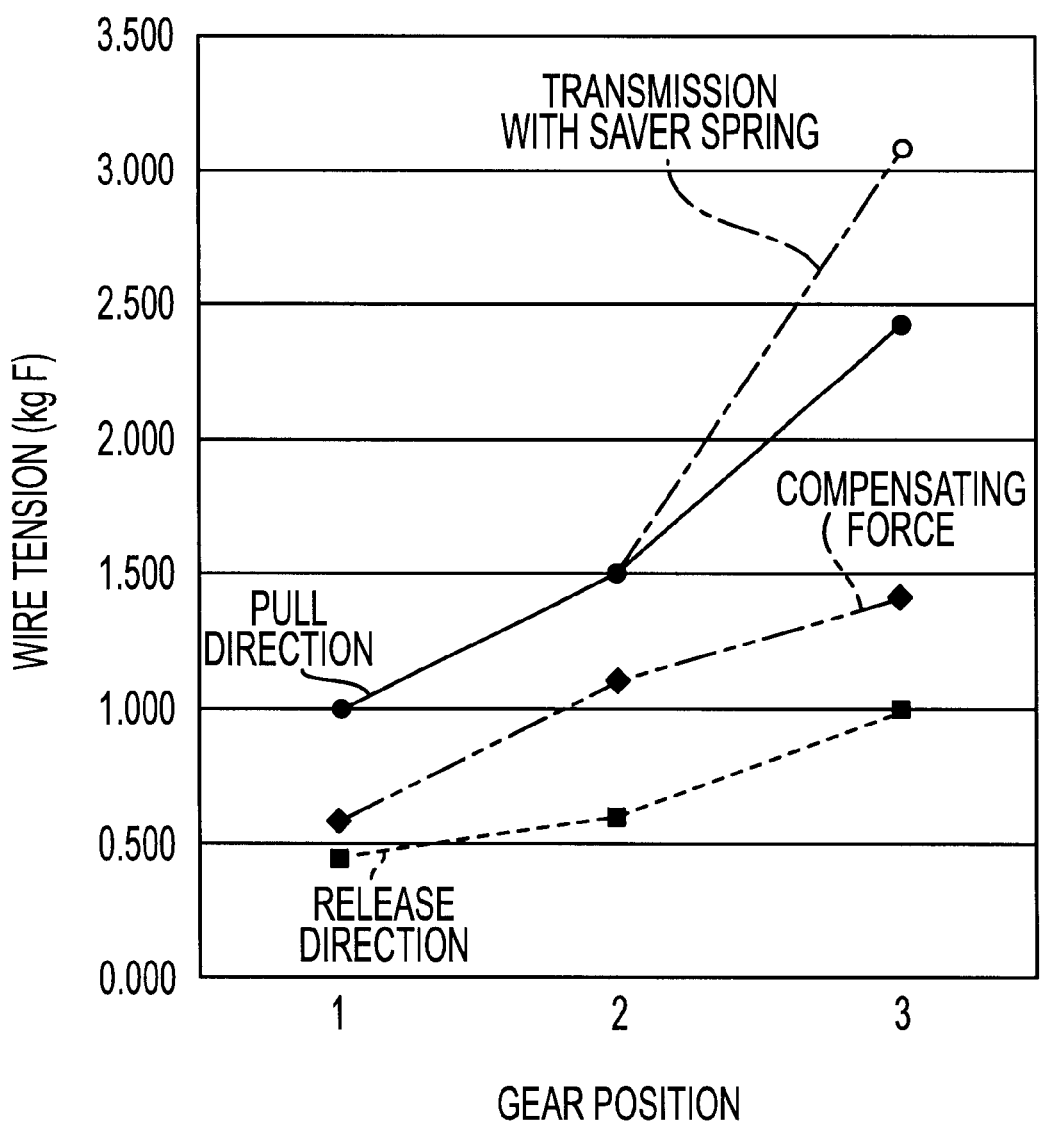
FIG. 8 is a graph illustrating the operating force characteristics in the pull and release direction of a conventional bicycle transmission, together with values of a compensating force applied by the force compensating apparatus according to the present invention.

FIG. 8 is a graph illustrating the operating force characteristics in the pull and release directions of a conventional bicycle transmission, together with values of a compensating force applied by the force compensating apparatus according to the present invention. As shown in FIG. 8, in a typical bicycle transmission a pulling force of approximately 1.0 kilogram must be applied to transmission actuating wire 76 to begin the shift from the low speed position to the intermediate speed position, and this pulling force must be increased to approximately 1.5 kilograms to complete the shift to the intermediate speed position. Similarly, a pulling force of approximately 1.5 kilograms must be applied to transmission actuating wire 76 to begin the shift from the intermediate speed position to the high speed position, and this pulling force must be increased to approximately 2.4 kilograms to complete the shift to the high speed position. If a saver spring is used to store the operating force when the transmission is unable to shift to the high speed position, such as when the bicycle is stopped, the pulling force must be increased to approximately 3.1 kilograms to complete the shift the high speed position. When the transmission is motor-driven, such required pulling forces place a severe demand on the motor.

When shifting from the high speed position to the low speed position, the return spring would immediately move the transmission from the high speed position to the low speed position, so in this case a counterbalancing force must be applied to hold the transmission in each desired speed position. More specifically, the return spring exerts a force of approximately 1.0 kilogram on transmission actuating wire 76 in the high speed position, so a counterbalancing force of 1.0 kilogram must be applied to transmission actuating wire 76 to maintain the transmission in the high speed position. When the transmission is in the intermediate speed position, the return spring exerts a force of approximately 0.6 kilogram on transmission actuating wire 76, so a counterbalancing force of approximately 0.6 kilogram must be applied to transmission actuating wire 76 to maintain the transmission in the intermediate speed position. Finally, when the transmission is in the low speed position, the return spring exerts a force of approximately 0.4 kilogram on transmission actuating wire 76, so a counterbalancing force of approximately 0.4 kilogram must be applied to transmission actuating wire 76 to maintain the transmission in the low speed position. These forces can be accommodated by a reasonably sized motor.

FIG. 8 also shows the values for a compensating spring force applied by the operating force compensating apparatus 14 according to the present invention. Operating force compensating apparatus 14 applies a compensating force of approximately 0.6 kilogram when intermediate member 84 is in the low speed position shown in FIG. 3; a compensating force of approximately 1.1 kilograms when intermediate member 84 is in the intermediate speed position shown in FIG. 6, and a compensating force of approximately 1.4 kilograms when intermediate member 84 is in the high speed position shown in FIG. 7.

Figure 9:
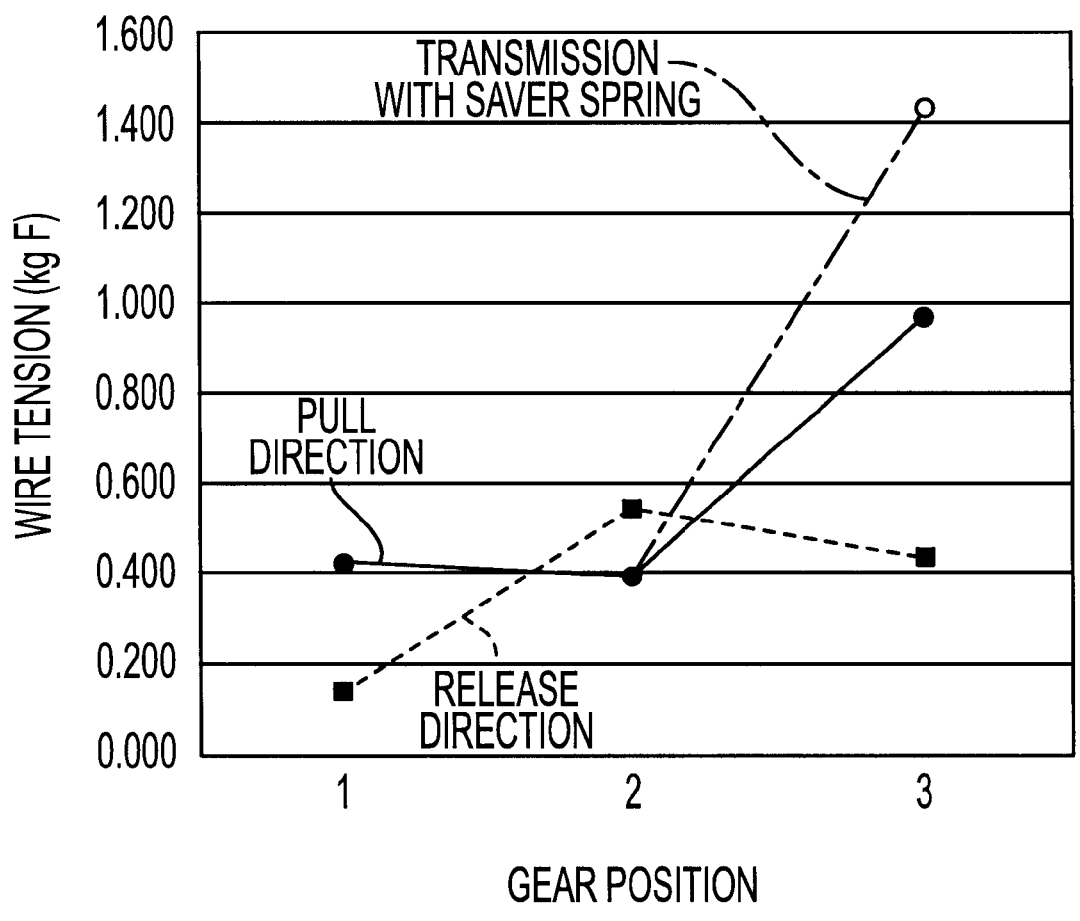
FIG. 9 is a graph illustrating the resulting force operating characteristics of the bicycle transmission when used with a force compensating apparatus according to the present invention.

FIG. 9 is a graph illustrating the resulting force operating characteristics of a motor driven bicycle transmission when used with a force compensating apparatus 14 according to the present invention. In the case of moving the transmission from the low speed position to the high speed position, the compensating force helps the motor pull transmission actuating wire 76. Thus, as shown in FIG. 9, a pulling force of slightly more than approximately 0.4 kilogram (1.0 kilogram required pulling force as shown in FIG. 8 minus 0.6 kilogram compensating force) must be applied by the motor to transmission actuating wire 76 to begin the shift from the low speed position to the intermediate speed position, and this pulling force can remain at approximately 0.4 kilogram to complete the shift to the intermediate speed position. Similarly, a pulling force of approximately 0.4 kilogram (1.5 kilograms required pulling force minus 1.1 kilograms compensating force) must be applied by the motor to transmission actuating wire 76 to begin the shift from the intermediate speed position to the high speed position, and this pulling force must be increased to slightly less than approximately 1.0 kilogram (2.4 kilograms required pulling force minus 1.4 kilogram compensating force) to complete the shift to the high speed position. If a saver spring is used to store the operating force when the transmission is unable to shift to the high speed position, the pulling force must be increased to only slightly more than approximately 1.4 kilograms to complete the shift the high speed position. These small pulling forces can be accommodated very easily using a small motor with very small drain on the battery.

In the case of shifting from the high speed position to the low speed position, the compensating force overpowers the return spring force, so the motor must provide a counterbalancing force to hold the transmission in the desired speed position. Thus, a holding force of slightly more than approximately 0.4 kilogram (1.4 kilogram compensating force as shown in FIG. 8 minus 1.0 kilogram return spring force) must be applied by the motor to transmission actuating wire 76 to maintain the transmission in the high speed position. A holding force of slightly more than approximately 0.5 kilogram (1.1 kilogram compensating force minus 0.6 kilogram return spring force) must be applied by the motor to transmission actuating wire 76 to maintain the transmission in the intermediate speed position, and a holding force of slightly more than approximately 0.2 kilogram (0.6 kilogram compensating force minus 0.4 kilogram return spring force) must be applied by the motor to transmission actuating wire 76 to maintain the transmission in the low speed position.

While the above is a description of various embodiments of the present invention, further modifications may be employed without departing from the spirit and scope of the present invention. For example, the spring force axis S may intersect the rotational axis X in some positions of intermediate member 84. The size, shape, location or orientation of the various components may be changed as desired. The functions of one element may be performed by two, and vice versa. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. A motor drive apparatus for a bicycle transmission comprising:

a support;

an interface member for coupling to a transmission actuating member that exerts a first force having a first force component in a first direction, wherein the interface member is mounted to the support for rotation around a rotational axis;

a motor for moving the interface member; and a biasing mechanism for exerting a second force on the interface member having a second force component in a second direction opposite the first direction.

2. The apparatus according to claim 1 wherein the biasing mechanism exerts the second force at a force applying location on the interface member.

3. A motor drive apparatus for a bicycle transmission comprising:

a support;

an interface member for coupling to a transmission actuating member that exerts a first force having a first force component in a first direction, wherein the interface member is mounted to the support for rotation around a rotational axis;

a motor for coupling to the interface member;

a biasing mechanism for exerting a second force on the interface member having a second force component in a second direction opposite the first direction;

wherein the biasing mechanism exerts the second force at a force applying location on the interface member; and a cam having a cam surface for varying the second force applied to the interface member by the biasing mechanism.

4. The apparatus according to claim 3 wherein the cam varies the force applying location relative to the rotational axis.

5. The apparatus according to claim 4 wherein the cam is rotatably coupled to the support, and wherein the motor rotates the cam.

6. The apparatus according to claim 5 wherein the cam includes a cam slot forming the cam surface, and wherein the interface member includes a cam follower that engages the cam slot.

7. The apparatus according to claim 6 further comprising a gear disposed on an outer peripheral surface of the cam.

8. The apparatus according to claim 7 further comprising a gear reduction mechanism disposed between the motor and the gear.

9. The apparatus according to claim 7 wherein the cam follower comprises a roller.

10. The apparatus according to claim 5 further comprising a position sensor for providing a signal indicating a position of the cam.

11. The apparatus according to claim 5 wherein the interface member includes an actuating member connector for connecting to the transmission actuating member.

12. The apparatus according to claim 11 wherein the actuating member connector is radially spaced apart from the rotational axis.

13. The apparatus according to claim 12 wherein the actuating member connector includes a cable connector for connecting to the transmission actuating member.

14. The apparatus according to claim 13 wherein the interface member includes a cable winding surface located in close proximity to the cable connector.

15. The apparatus according to claim 14 wherein the interface member comprises a lever.

16. The apparatus according to claim 12 wherein the interface member includes a cam follower for engaging the cam surface.

17. The apparatus according to claim 16 wherein the cam follower is located at a radial position between the actuating member connector and the rotational axis.

18. The apparatus according to claim 17 wherein the interface member comprises a lever.

19. The apparatus according to claim 18 wherein the cam follower is located at an intermediate portion of the lever between the actuating member connector and the rotational axis.

20. The apparatus according to claim 17 wherein a first axis extending between the rotational axis and the force applying location is inclined relative to a second axis extending between the rotational axis and the cam follower.

21. The apparatus according to claim 12 wherein the biasing mechanism comprises a spring having a first end retained relative to the support and a second end retained relative to the interface member.

22. The apparatus according to claim 21 wherein the spring exerts the second force along a spring axis.

23. The apparatus according to claim 22 wherein the spring axis is radially spaced apart from the rotational axis.

24. The apparatus according to claim 23 wherein the interface member comprises a lever.

* * * * *